US010648419B2

(12) United States Patent
Satake

(10) Patent No.: US 10,648,419 B2
(45) Date of Patent: May 12, 2020

(54) FUEL INJECTION CONTROL DEVICE AND FUEL INJECTION SYSTEM

(71) Applicant: DENSO CORPORATION, Kariya, Aichi-pref. (JP)

(72) Inventor: Nobuyuki Satake, Kariya (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 15/770,319

(22) PCT Filed: Sep. 21, 2016

(86) PCT No.: PCT/JP2016/077772

§ 371 (c)(1),
(2) Date: Apr. 23, 2018

(87) PCT Pub. No.: WO2017/077779

PCT Pub. Date: May 11, 2017

(65) Prior Publication Data

US 2018/0320620 A1 Nov. 8, 2018

(30) Foreign Application Priority Data

Nov. 5, 2015 (JP) ................................ 2015-217817

(51) Int. Cl.
*F02D 41/20* (2006.01)
*F02M 61/10* (2006.01)
(Continued)

(52) U.S. Cl.
CPC ............. *F02D 41/20* (2013.01); *F02D 41/34* (2013.01); *F02D 41/40* (2013.01); *F02D 41/402* (2013.01);
(Continued)

(58) Field of Classification Search
CPC .......... F02D 41/20; F02D 41/34; F02D 41/40; F02D 41/402; F02D 2041/2006;
(Continued)

(56) References Cited

U.S. PATENT DOCUMENTS 6,571,773 B1 * 6/2003 Yamakado .............. F02D 41/20 123/486
6,892,708 B2 * 5/2005 Nasu ........................ F02D 41/20 123/490
(Continued)

FOREIGN PATENT DOCUMENTS

| | | |
|---|---|---|
| JP | 2005-163625 | 6/2005 |
| JP | 2014-171312 | 9/2014 |
| WO | 2013/191267 | 12/2013 |

*Primary Examiner* — Hung Q Nguyen
*Assistant Examiner* — Mark L. Greene
(74) *Attorney, Agent, or Firm* — Nixon & Vanderhye P.C.

(57) ABSTRACT

A fuel injection control device includes an electric controller controlling an opening and closing of an injector by energizing a coil in the injector, and a booster circuit boosting a battery voltage to generate a boost voltage. The electric controller includes a valve-opening control unit applying the boost voltage and then applying the battery voltage to the coil to execute a valve-opening control to generate a required valve-opening force, an open valve maintenance control unit applying the battery voltage to the coil to execute an open valve maintenance control to generate an open valve maintenance force and is smaller the required valve-opening force, after the valve-opening control, and a current correction control unit executing a current correction control to correct a maximum value of a current flowing through the coil when the boost voltage is applied in the valve-opening control, according to a decreasing quantity of the battery voltage.

13 Claims, 11 Drawing Sheets

(51) Int. Cl.

| | |
|---|---|
| ***F02M 45/08*** | (2006.01) |
| ***F02D 41/40*** | (2006.01) |
| ***F02M 51/06*** | (2006.01) |
| ***F02M 51/00*** | (2006.01) |
| ***F02D 41/34*** | (2006.01) |
| ***F02M 61/16*** | (2006.01) |

(52) U.S. Cl.

CPC .......... *F02M 45/083* (2013.01); *F02M 51/00* (2013.01); *F02M 51/06* (2013.01); *F02M 51/0653* (2013.01); *F02M 61/10* (2013.01); *F02M 61/161* (2013.01); *F02D 2041/2006* (2013.01); *F02D 2041/2013* (2013.01); *F02D 2041/2051* (2013.01); *F02D 2041/2058* (2013.01); *F02D 2200/503* (2013.01); *F02M 61/16* (2013.01); *F02M 2200/21* (2013.01); *F02M 2200/247* (2013.01); *Y02T 10/44* (2013.01)

(58) Field of Classification Search

CPC ..... F02D 2041/2013; F02D 2041/2051; F02D 2041/2058; F02D 2200/503; F02M 45/083; F02M 51/00; F02M 51/06; F02M 51/0653; F02M 61/10; F02M 61/16; F02M 61/161; F02M 2200/21; F02M 2200/247; Y02T 10/44

See application file for complete search history.

(56) References Cited

U.S. PATENT DOCUMENTS

| | | | | |
|---|---|---|---|---|
| 8,214,132 | B2 * | 7/2012 | Bunni ..................... | F02D 41/20<br>123/472 |
| 2004/0163379 | A1 * | 8/2004 | Pott ......................... | F02D 37/02<br>60/284 |
| 2011/0220067 | A1 | 9/2011 | Okonogi et al. | |
| 2011/0222202 | A1 | 9/2011 | Onda et al. | |
| 2014/0238354 | A1 * | 8/2014 | Imai ........................ | F02D 41/20<br>123/478 |
| 2015/0144109 | A1 | 5/2015 | Mukaihara et al. | |
| 2016/0298565 | A1 * | 10/2016 | Nagatomo .............. | F02D 41/20 |

* cited by examiner

FUEL INJECTION CONTROL DEVICE AND FUEL INJECTION SYSTEM

CROSS REFERENCE TO RELATED APPLICATION

This application is the U.S. national phase of International Application No. PCT/JP2016/077772 filed Sep. 21, 2016, which designated the U.S. and claims priority to Japanese Patent Application No. 2015-217817 filed on Nov. 5, 2015, the entire contents of each of which are incorporated herein by reference.

TECHNICAL FIELD

The present disclosure relates to a fuel injection control device which controls a quantity of a fuel injected into an internal combustion engine.

BACKGROUND ART

Conventionally, an injector according to Patent Literature 1 includes a stator core that generates an attractive force while a coil is energized, and a movable core that is attracted by the stator core and moves together with a valve body. An electric controller controls an energization of the coil to open the injector. The electric controller controls a time that the injector is being opened, that is, the electric controller controls an injection time of the fuel injected into the internal combustion engine which is equivalent to an injection quantity. The electric controller switches between a voltage of a battery and a boost voltage that is the voltage of the battery boosted by a booster circuit, in the energization of the coil.

When the attractive force is greater than a valve-opening force that is a force obtained by adding the fuel pressure in the injector to an elastic force of an elastic component such as a spring in the injector, the injector is opened. The electric controller executes a control to increase a current flowing through the coil to a peak current value that is a current value that is predetermined, by applying the boost voltage to the coil. Then, the electric controller executes a control to control an average value of the current flowing through the coil at a pickup current value that is lower than the peak current value, by a duty control that alternatively energizes and deenergizes the coil by the voltage of the battery. The attractive force exceeding the valve-opening force is generated by executing the above control, and the injector is opened.

Since the fuel pressure pressing in a direction to suppress the movable core decreases while the fuel is injected when the injector is opened, the attractive force that is less than the valve-opening force can be generated and held. The electric controller executes a control to control the average value of the current flowing through the coil at a holding current value that is a current value that is predetermined, by executing the duty control. The holding current value has a magnitude that is less than the pickup current value and is used to generate the attractive force sufficient to hold the opening of the injector.

PRIOR ART LITERATURES

Patent Literature

Patent Literature 1: JP2014-5740A

SUMMARY OF INVENTION

However, when the above fuel injection quantity control is executed in a case where the voltage of the battery decreases, the pickup current value decreases, and it is possible that the attractive force sufficient to open the injector is not generated. Then, when the electric controller instructs to open the injector, the injector cannot be opened since the attractive force that is sufficient is not generated at the coil. Thus, the fuel cannot be injected into the internal combustion engine with the injection quantity that is requested.

It is an object of the present disclosure to provide a fuel injection control device which can open an injector and control a fuel injection quantity when a voltage of a battery is lowered.

According to a first aspect of the present disclosure, the fuel injection control device includes an electric controller to control an opening and closing of the injector by energizing a coil in the injector, and a booster circuit to boost a battery voltage that is a voltage supplied from a battery to generate a boost voltage. The electric controller includes a valve-opening control unit to apply the boost voltage to the coil and then to apply the battery voltage to the coil to execute a valve-opening control to generate a required valve-opening force that is an attractive force required to start to open the injector, an open valve maintenance control unit to apply the battery voltage to the coil to execute an open valve maintenance control to generate an open valve maintenance force that is an attractive force holding the opening of the injector and is smaller the required valve-opening force, after the valve-opening control, and a current correction control unit to execute a current correction control to correct a maximum value of a current flowing through the coil when the boost voltage is applied to the coil in the valve-opening control, according to a decreasing quantity of the battery voltage.

According to the present aspect, when the battery voltage decreases, the electronic controller energizes the coil by applying the boost voltage to the coil and executes the correction of the current value to increase a maximum value of the current flowing through the coil, thereby increasing the attractive force generated at the coil. In other words, the attractive force decreased due to a decrease of the battery voltage is corrected by the correction, and the attractive force can be increased to a force required to open the injector. Thus, when a power voltage of the battery decreases, the fuel injection can be controlled by opening the injector.

According to a second aspect of the present disclosure, the fuel injection control device includes an electric controller to control an opening and closing of the injector by energizing a coil in the injector, and a booster circuit to boost a battery voltage that is a voltage supplied from a battery to generate a boost voltage. The electric controller includes a valve-opening control unit to apply the boost voltage to the coil and then to apply the battery voltage to the coil to execute a valve-opening control to generate a required valve-opening force that is an attractive force required to start to open the injector, an open valve maintenance control unit to apply the battery voltage to the coil to execute an open valve maintenance control to generate an open valve maintenance force that is an attractive force holding the opening of the injector and is smaller the required valve-opening force, after the valve-opening control, and a current continuation control unit to continue a state that an average value of a current flowing through the coil is a maximum value for a predetermined time interval after the current flowing through the coil becomes the maximum value when the boost voltage is applied to the coil in the valve-opening control, and to execute a current continuation control to extend the predetermined time interval according to a decreasing quantity of the battery voltage.

According to the present aspect, a state that the attractive force sharply increases can be continued by continuing a state that the average value of the current flowing through the coil is maximum for the continuation time interval calculated according to the decreasing quantity of the battery voltage. Thus, the attractive force required to open the injector can be generated when the battery voltage decreases, and the fuel injection quantity can be controlled by opening the injector when the battery voltage decreases.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

First Embodiment

Figure 1:
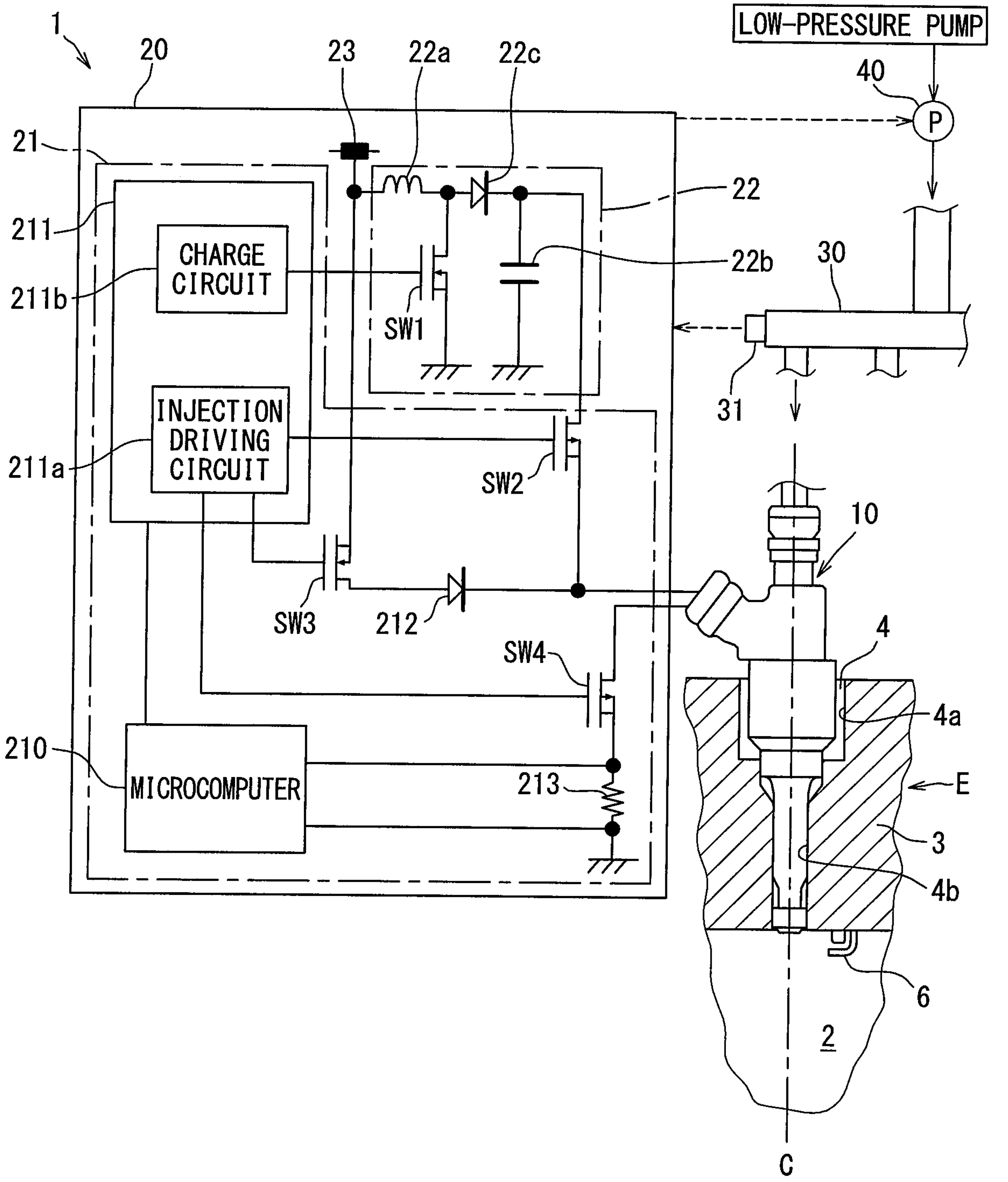
FIG. 1 is a diagram showing an outline of a fuel injection system according to at least one embodiment of the present disclosure.

Embodiments of the present disclosure will be described hereafter referring to drawings. The substantially same parts or components as those in the embodiments are indicated with the same reference numerals and the same descriptions may be omitted.

As shown in FIG. 1, a fuel injection system 1 controls an opening and closing of an injector 10 by a fuel injection control device 20 and controls a fuel injection of the injector 10 to a combustion chamber 2 of an internal combustion engine E.

The injector 10 is attached to the internal combustion engine E (gasoline engine) of an ignition type. The injector 10 directly injects a fuel into the combustion chamber 2 of the internal combustion engine E. Specifically, an attachment hole 4 into which the injector 10 is inserted is coaxially located with a cylinder head 3 that defines the combustion chamber 2. In other words, the attachment hole 4 includes an axial line that overlaps an axial line C of a cylinder including the cylinder head 3.

The fuel supplied to the injector 10 is stored in a fuel tank that is not shown. The fuel in the fuel tank is drawn by a low-pressure pump, compressed by a high-pressure pump 40, and then is introduced to a delivery pipe 30. A high-pressure fuel in the delivery pipe 30 is distributed and supplied to the injector 10 of each cylinder.

An ignition plug 6 is attached to the cylinder head 3. The ignition plug 6 and the injector 10 are arranged in a line at a part of the cylinder head 3 facing a piston of the combustion chamber 2.

Figure 2:
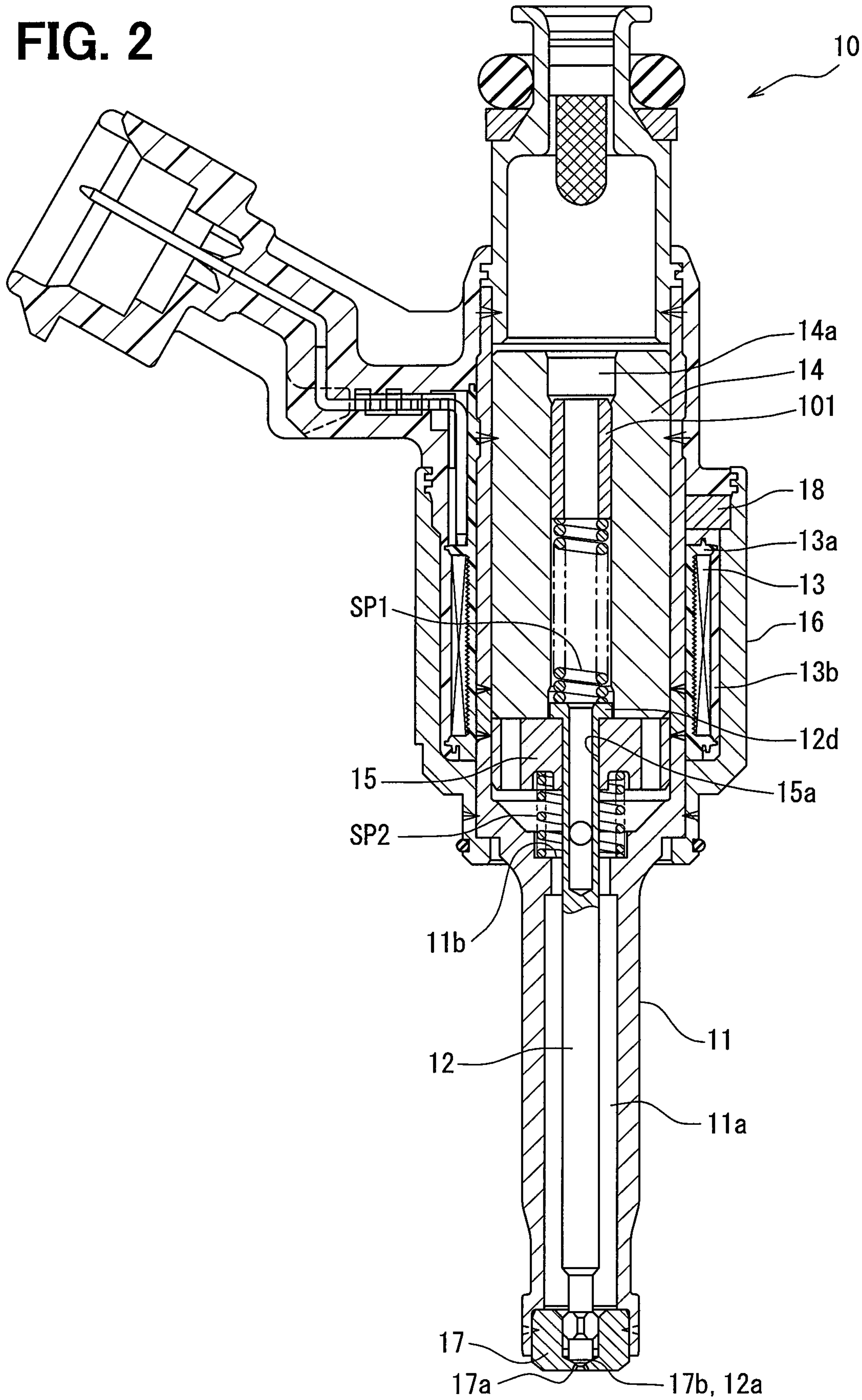
FIG. 2 is a cross-sectional view showing a configuration of an injector shown in FIG. 1.

As shown in FIG. 2, the injector 10 includes a body 11, a valve body 12, a coil 13, a stator core 14, a movable core 15, and a housing 16. The body 11 is made of a magnetic material. The body 11 includes (defines) a fuel passage 11*a*.

The body 11 includes a seat surface 17*b* and an injection hole 17*a*. The valve body 12 is seated on or removed (separated) from the seat surface 17*b*, and the injection hole 17*a* injects the fuel.

When the valve body 12 is closed, a seat part 12*a* is seated on the seat surface 17*b*, and a fuel injection from the injection hole 17*a* is stopped. When the valve body 12 is opened, the seat part 12*a* is separated from the seat surface 17*b*, and the fuel is injected from the injection hole 17*a*.

The stator core 14 is made of a magnetic material and is a cylindrical shape. The stator core 14 includes (defines) a fuel passage 14*a*. The stator core 14 is inserted to be disposed on an inner peripheral surface of the body 11, and a bobbin 13*a* is inserted to be disposed on an outer peripheral surface of the body 11.

The movable core 15 is made of a magnetic material and is a disc shape. The movable core 15 is inserted to be disposed on the inner peripheral surface of the body 11. The movable core 15 is disposed between the stator core 14 and the injection hole 17*a*. When the coil 13 is deenergized, the movable core 15 is located at a position facing the stator core 14 with a gap that is predetermined.

When the coil 13 is energized, an attractive force is generated at the stator core 14, and the movable core 15 is attracted toward the stator core 14 by the attractive force. As a result, the valve body 12 that is connected with the movable core 15 is opened by cancelling a force that is a sum of an elastic force of a main spring SP1 and a fuel-pressure valve-closing force (valve-opening operation). The fuel-pressure valve-closing force is a force that is generated according to a fuel pressure in the fuel passage 11*a* and presses the valve body 12 in a valve-closing direction. When the coil 13 is deenergized, the valve body 12 is moved together with the movable core 15 by the elastic force of the main spring SP1 (valve-closing operation).

The movable core 15 includes (defines) a through hole 15*a*. The valve body 12 is inserted into and disposed in the through hole 15*a*. The valve body 12 is attached to the movable core 15, and is slidable relative to the movable core 15.

The valve body 12 includes a locking part 12*d* at an end part opposite to the injection hole. When the movable core 15 is moved by being attracted by the stator core 14, the locking part 12*d* is locked to the movable core 15. Thus, the valve body 12 starts to move while the movable core 15 starts to move (valve-opening operation). When the movable core 15 is in contact with the stator core 14, the valve body 12 can move relative to the movable core 15 to execute the valve-opening operation.

The main spring SP1 is arranged at the end part of the valve body 12 opposite to the injection hole 17*a*. A sub spring SP2 is arranged at an end part of the movable core 15 close to the injection hole 17*a*. The main spring SP1 and the sub spring SP2 are a coil shape and elastically deforms in a direction parallel to the axial line C. The elastic force of the main spring SP1 corresponding to a main elastic force Fs1 is applied to the valve body 12 in the valve-closing direction as a reactive force of an adjusting pipe 101. An elastic force of the sub spring SP2 corresponding to a sub elastic force Fs2 is applied to the movable core 15 in an attraction direction as a reactive force of a concave portion 11*b* of the body 11.

The valve body 12 is located between the main spring SP1 and the seat surface 17*b*. The movable core 15 is located between the sub spring SP2 and the locking part 12*d*. The sub elastic force Fs2 is transmitted to the locking part 12*d* via the movable core 15 and is applied to the valve body 12 in a valve-opening direction. Therefore, an elastic force Fs that is obtained by subtracting the sub elastic force Fs2 from the main elastic force Fs1 is applied to the valve body 12 in the valve-closing direction.

As shown in FIG. 1, the fuel injection control device 20 includes an electronic controller 21 and a booster circuit 22. The electronic controller 21 includes a microcomputer 210, an integrated circuit 211 and switching elements SW2, SW3 and SW4. A battery 23 that is a constant voltage power source located at an exterior of the fuel injection control device 20 supplies a voltage to the fuel injection control device 20.

The microcomputer 210 includes a central processing unit, a nonvolatile memory (ROM) and a volatile memory (RAM). The microcomputer 210 calculates a request injection quantity Qreq of the fuel and a target injection start timing of the fuel, based on a load of the internal combustion engine E and a rotation speed of the internal combustion engine E. The microcomputer 210 controls the injection quantity Q by controlling an energization time Ti of the coil 13 according to a characteristic line that indicates a relationship between the energization time Ti and the injection quantity Q and is previously obtained by a test.

For example, a map (Ti-Q map) indicating the relationship between the energization time Ti and the injection quantity Q is established based on the above characteristic line, and the Ti-Q map is stored in a memory. The microcomputer 210 sets the energization time Ti fit to the request injection quantity that is equivalent to the injection quantity that is requested, by the Ti-Q map. The energization time Ti decreases in accordance with an increase in supply fuel pressure that is a pressure of the fuel supplied to the injector 10. In other words, the energization time Ti decreases in accordance with an increase in fuel pressure of the delivery pipe 30. The Ti-Q map is established for each supply fuel pressure. The microcomputer 210 switches the Ti-Q map according to the supply fuel pressure in the injection.

The integrated circuit 211 includes an injection drive circuit 211*a* that controls operations of the switching elements SW2, SW3 and SW4 and a charge circuit 211*b* that controls an operation of the booster circuit 22. The injection drive circuit 211*a* and the charge circuit 211*b* operate based on an injection instruction signal output by the microcomputer 210. The injection instruction signal is a signal that instructs an energization state of the coil 13 in the injector 10. The microcomputer 210 sets the injection instruction signal based on the request injection quantity Qreq, the target injection start timing and a coil current detection value I.

The booster circuit 22 includes a choke coil 22*a*, a capacitor 22*b*, a diode 22*c* and a switching element SW1. The charge circuit 211*b* controls the switching element SW1 to be repeatedly turned on and off. A battery voltage Vbatt applied to a terminal Batt of the battery 23 is boosted by the choke coil 22*a*, and an electric power is charged to the capacitor 22*b*. A voltage of the electric power that is boosted and is stored is equivalent to a boost voltage Vboost.

When the injection drive circuit 211*a* turns on the switching elements SW2 and SW4, the boost voltage Vboost is applied to the coil 13 of the injector 10. When the injection drive circuit 211*a* switches to turn off the switching element SW2 and turn on the switching element SW3, the battery voltage Vbatt is applied to the coil 13 of the injector 10. When the injection drive circuit 211*a* turns off the switching elements SW2, SW3 and SW4, no voltage is applied to the coil 13. A diode 212 prevents the boost voltage Vboost from being applied to the switching element SW3 when the switching element SW2 is turned on.

A shunt resistor 213 is used to sense a current flowing through the switching element SW4. In this case, the current is a coil current that flows through the coil 13. The microcomputer 210 senses the coil current detection value I based on a voltage drop quantity generated at the shunt resistor 213.

Next, a control of the injector 10 executed by the electronic controller 21 by an attractive force generated by the coil current will be described referring to FIG. 11.

The attractive force increases in accordance with an increase in magnetomotive force generated at the stator core 14. When the current of the coil 13 becomes larger in a case where a winding number of the coil 13 is constant, the magnetomotive force becomes larger, and the attractive force becomes larger. In this case, a time interval from a time point that the energization starts to a time point that the attractive force is saturated to be a maximum value becomes longer. According to the present embodiment, the attractive force that is saturated to be the maximum value is referred to as a static attractive force Fmax.

The attractive force required to start the valve-opening operation of the valve body 12 is referred to as a required valve-opening force Fopen. A valve-opening start attractive force that is the attractive force required to start the valve-opening operation of the valve body 12 increases in accordance with an increase in supply fuel pressure of the injector 10. Further, the valve-opening start attractive force increases according to various circumstances including that a viscosity of the fuel increases. The valve-opening start attractive force when it is assumed that the valve-opening start attractive force becomes maximum is defined as the required valve-opening force Fopen.

Figure 11:
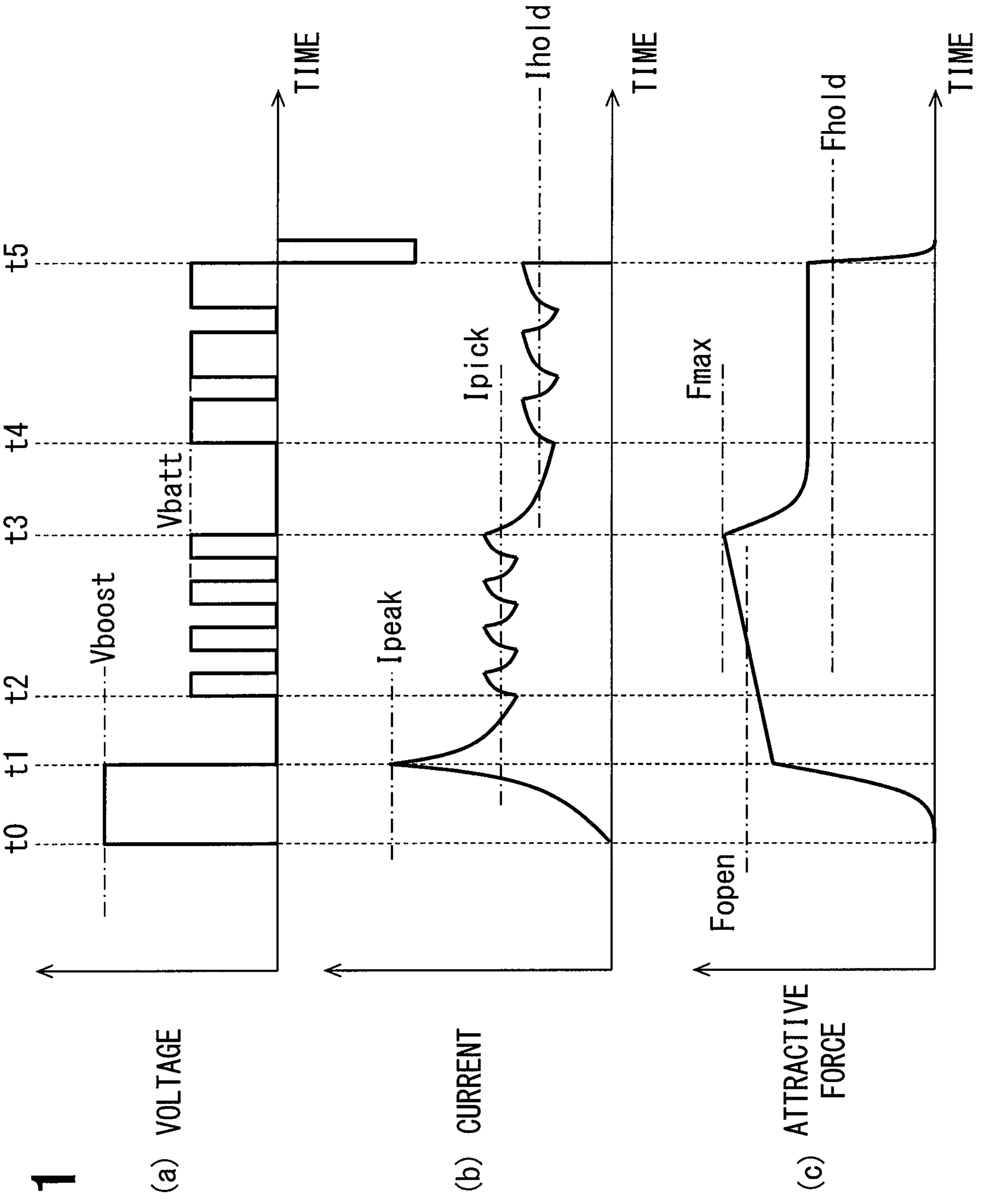
FIG. 11 includes (a), (b) and (c), (a) is a graph showing the variation of the applied voltage of the coil over time, (b) is a graph showing the variation of the current flowing through the coil over time, (c) is a graph showing the variation of the attractive force over time, when the electronic controller executes the injection control according to a conventional example.

FIG. 11 includes (a) showing a waveform of an applied voltage of the coil 13 when the fuel injection is executed for once. As shown in (a) of FIG. 11, the boost voltage Vboost is applied to start the energization at a time point ta that a voltage application instructed by the injection instruction signal starts. The time point ta is a start time point of the energization time Ti. Then, as shown in (b) of FIG. 11, the coil current increases to a peak current value Ipeak that is a target current value that is predetermined. The energization is turned off at the time point ta that the coil current detection value I reaches the peak current value Ipeak. The coil current is controlled to increase to the peak current value Ipeak by the application of the boost voltage Vboost in an initial energization.

Then, the energization by the battery voltage Vbatt is controlled such that the coil current is held at a pickup current value Ipick that is lower than the peak current value Ipeak. Specifically, the energization by the battery voltage Vbatt is repeatedly turned on and off such that a deviation between the coil current detection value I and the pickup current value Ipick is in a predetermined range. In this case, a duty control is executed to hold an average value of the coil current at the pickup current value Ipick. The pickup current value Ipick is set to be a value where the static attractive force Fmax is greater than or equal to the required valve-opening force Fopen. In other words, since the coil current is held at the pickup current value Ipick, the attractive force more gradually increases than the attractive force when the boost voltage Vboost is applied, and the static attractive force Fmax is greater than or equal to the required valve-opening force Fopen.

Then, the energization by the battery voltage Vbatt is controlled such that the coil current is held at a holding current value Ihold that is lower than the pickup current value Ipick. Specifically, the energization by the battery voltage Vbatt is repeatedly turned on and off such that a deviation between the coil current detection value I and the holding current value Ihold is in a predetermined range. In this case, a duty control is executed to hold the average value of the coil current that varies at the holding current value Ihold.

As shown in (c) of FIG. 11, the attractive force continuously increases in a time interval from an energization start time point t0 to a pickup control end time point t3. An increasing rate of the attractive force in a time interval from the energization start time point t0 to a time point to that the coil current detection value I becomes the peak current value Ipeak is slower than the increasing rate of the attractive force in a pickup control time interval from a time point tb to the pickup control end time point t3. The peak current value Ipeak, the pickup current value Ipick and the pickup control time interval are set such that the attractive force exceeds the required valve-opening force Fopen in a time interval where the attractive force increases. In this case, the time interval is from the energization start time point t0 to the pickup control end time point t3.

It is preferable that the attractive force greater than or equal to the required valve-opening force Fopen is generated in the pickup control time interval. Since the injector is suddenly opened by using the boost voltage Vboost, it is possible that the injector malfunctions due to a noise of an opening operation or a collision generated due to the opening operation that is a sudden operation. A malfunction of the injector generated due to the noise or the collision can be prevented by gradually increasing the attractive force by a pickup control without suddenly opening the injector by applying the boost voltage Vboost. The required valve-opening force Fopen is a force that is a sum of a fuel-pressure valve-closing force that is a force generated according to the fuel pressure in the injector 10 and the elastic force of an elastic component in the injector 10. In this case, the elastic component may be a spring. Since the elastic force of the elastic component is substantially constant, the required valve-opening force Fopen is set by the fuel-pressure valve-closing force. In other words, the peak current value Ipeak, the pickup current value Ipick and the pickup control time interval are set according to the fuel pressure of the fuel supplied to the injector 10.

The attractive force is held at a predetermined value in an open valve maintenance control time interval from a time point t4 to a time point t5. The holding current value Ihold is set such that the predetermined value is greater than an open valve maintenance force Fhold necessary to hold a valve-opening state. The open valve maintenance force Fhold is less than the required valve-opening force Fopen.

An injection signal included in the injection instruction signal is a pulse signal that instructs the energization time Ti. A pulse on time point of the injection signal is set to the energization start time point t0 that is earlier than a target injection start time point by an injection delay time that is predetermined. A pulse off time point of the injection signal is set to an end time point of the energization time Ti. In this case, the end time point of the energization time Ti is the time point t5 that a time interval corresponding to the energization time Ti has elapsed since a time point that the pulse is turned on. The switching element SW4 is controlled by the injection signal.

A boost signal included in the injection instruction signal is a pulse signal that instructs an on and off operation of the energization by the boost voltage Vboost. A pulse of the boost signal is turned on at the same time that a pulse of the injection signal is turned on. Then, in a time interval until the coil current detection value I reaches the peak current value Ipeak, the boost signal is repeatedly turned on and off. The switching member SW2 is controlled according to an on and off operation of the boost signal. The boost voltage Vboost is applied to the coil 13 in a time interval from the time point t0 to the time point to shown in FIG. 11.

A battery signal included in the injection instruction signal is a pulse signal, and a pulse of the battery signal is turned on at a start time point tb of the pickup control. Then, in a time interval from an energization start to a time point that an elapsed time reaches a predetermined time, a feedback control is executed to repeatedly turn on and off the battery signal such that the coil current detection value I is held at the pickup current value Ipick. Then, in a time interval until a time point that the pulse of the injection signal is turned off, a feedback control is executed to repeatedly turn on and off the battery signal such that the coil current detection value I is held at the holding current value Ihold. The switching element SW3 is controlled by the battery signal.

As shown in FIG. 1, a fuel pressure sensor 31 attached to the delivery pipe 30 senses the supply fuel pressure of the injector 10. The electronic controller 21 determines whether to execute the pickup control according to the supply fuel pressure sensed by the fuel pressure sensor 31. For example, when the supply fuel pressure is greater than or equal to a predetermined value, the electronic controller 21 allows the pickup control. When the supply fuel pressure is less than the predetermined value, the electronic controller 21 prohibits the pickup control and executes an open valve maintenance control after the boost voltage Vboost is applied to the coil 13.

In the control of the injector 10, when the battery voltage Vbatt decreases by a predetermined voltage (ΔV), following matters exist.

Similar to the control of the injector 10 as the above description and as shown in FIG. 11, the energization starts by applying the boost voltage Vboost to the coil 13, and the coil current increases to the peak current value Ipeak that is the target current value that is predetermined. When the attractive force is greater than the required valve-opening force Fopen by the application of the boost voltage Vboost, the injector 10 is opened. When the attractive force is less than the required valve-opening force Fopen by the application of the boost voltage Vboost, the injector 10 is closed.

When the battery voltage Vbatt decreases by the predetermined voltage (ΔV), it is necessary to enlarge a range of a duty in the pickup control to hold the coil current at the pickup current value Ipick of when the battery voltage Vbatt does not decrease by the predetermined voltage (ΔV). When a decreasing quantity ΔV of the battery voltage Vbatt is large that the coil current cannot be held at the pickup current value Ipick of when the battery voltage Vbatt does not decrease by the predetermined voltage in case where the range of the duty is enlarged, the pickup current value Ipick is smaller than that of when the battery voltage Vbatt does not decrease by the predetermined voltage. Then, the attractive force cannot be greater than or equal to the required valve-opening force Fopen. The static attractive force Fmax cannot be greater than or equal to the required valve-opening force Fopen in a time interval where the attractive force increases, it is possible that the injector 10 cannot be opened. In this case, the time interval is from the energization start time point t0 to the pickup control end time point t3.

Figure 3:
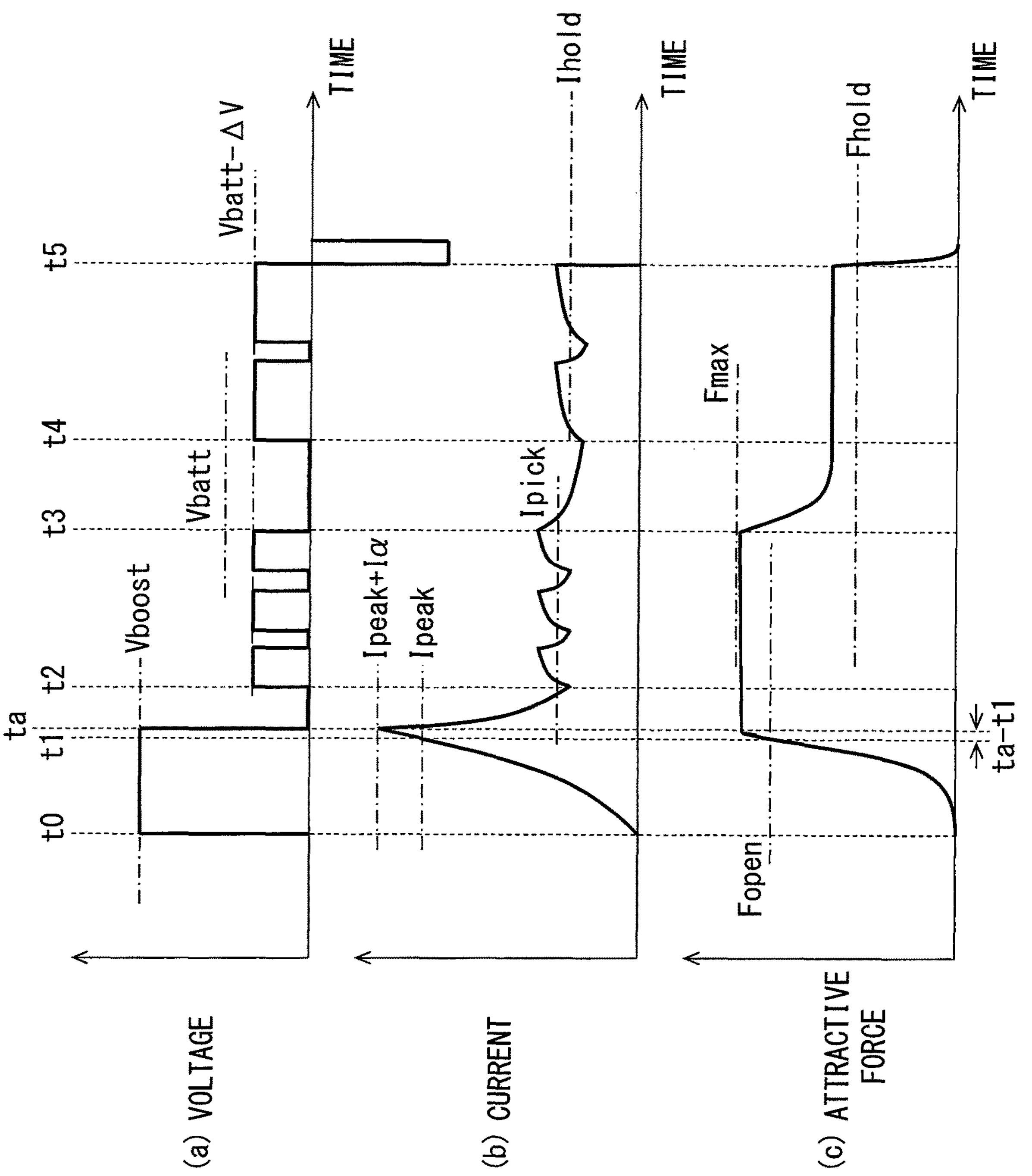
FIG. 3 includes (a), (b) and (c), (a) is a graph showing a variation of an applied voltage of a coil over time, (b) is a graph showing a variation of a current flowing through the coil over time, (c) is a graph showing a variation of an attractive force over time, when an electronic controller executes an injection control according to at least one embodiment of the present disclosure.
Figure 4:
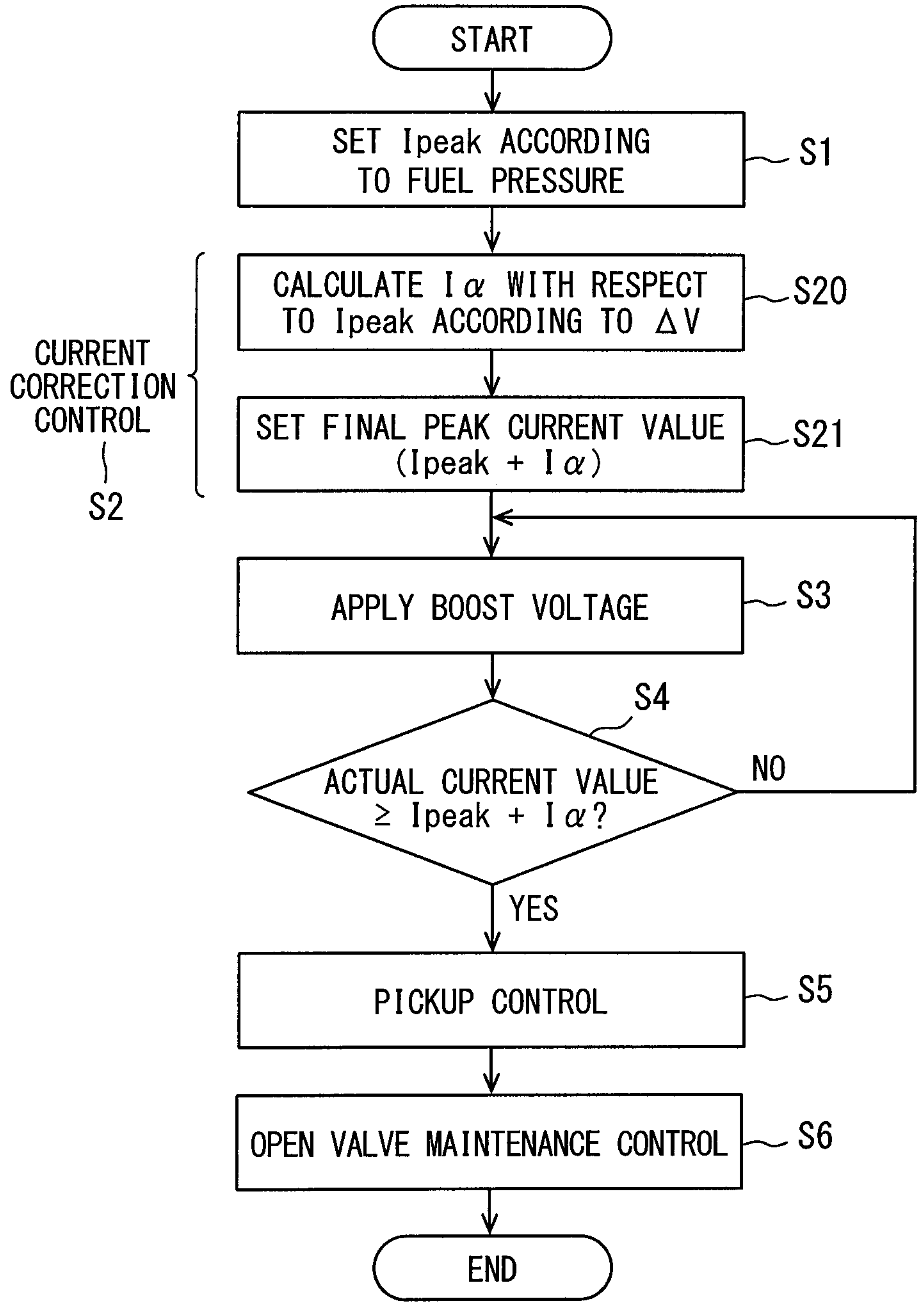
FIG. 4 is a flowchart showing a control executed by the electronic controller 21 according at least one embodiment of the present disclosure.

According to a first embodiment, as shown in FIGS. 3 and 4, the electronic controller 21 executes a correction to increase the peak current value Ipeak when the battery voltage Vbatt decreases by the predetermined voltage (ΔV). The attractive force greater than the required valve-opening force Fopen is generated at the coil 13 by the correction. Hereafter, the first embodiment will be described. The microcomputer 210 of the electronic controller 21 according to the first embodiment functions as a valve-opening control unit, an open valve maintenance control unit and a current correction control unit.

As shown in FIG. 4, at S1 in the valve-opening control unit, the peak current value Ipeak shown in FIG. 3 is set according to the fuel pressure of the fuel supplied to the injector 10.

At S20 in the current correction control unit, a current correction quantity Iα that is an increasing correction quantity with respect to the peak current value Ipeak is calculated according to the decreasing quantity ΔV of the battery voltage Vbatt. The decreasing quantity ΔV is sensed by the electronic controller 21 receiving a change of the battery voltage Vbatt transmitted from a sensor of the battery voltage Vbatt that is attached to the battery 23 and is not shown. The current correction quantity Iα is set to correct the attractive force that is insufficient due to a decreasing of the battery voltage Vbatt. In other words, when the battery voltage (Vbatt−ΔV) that is the battery voltage Vbatt decreased by the decreasing quantity ΔV is less than a predetermined voltage value where the attractive force greater than or equal to the required valve-opening force Fopen cannot be generated, the electronic controller 21 calculates the current correction quantity Iα and executes the correction. The electronic controller 21 may execute the correction when the battery voltage (Vbatt−ΔV) is less than the predetermined voltage value. Alternatively, the electronic controller 21 may calculate the current correction quantity Iα and correct the peak current value Ipeak, according to the decreasing quantity ΔV of the battery voltage Vbatt.

At S21 in the current correction control unit, a final peak current value (Ipeak+Iα) is set based on the current correction quantity Iα that is calculated. The final peak current value (Ipeak+Iα) is set to a value that the attractive force is greater than or equal to the required valve-opening force Fopen. Then, S20 and S21 of S2 in the current correction control unit are completed.

As shown in FIG. 4, at S3 in the valve-opening control unit, the microcomputer 210 transmits an instruction to apply the boost voltage Vboost to the integrated circuit 211. When the instruction is transmitted, the boost voltage Vboost is applied to the coil 13. The boost voltage Vboost is continuously applied to the coil 13 until the coil current detection value I becomes greater than or equal to the peak current value (Ipeak+Iα) that is corrected. A time interval where the boost voltage Vboost is applied to the coil 13 is a time interval from the energization start time point t0 to the pickup control end time point t3 as shown in FIG. 3. According to the first embodiment, the time interval where the boost voltage Vboost is applied to the coil 13 is a time interval from the energization start time point t0 to a time point ta. Thus, the time interval where the boost voltage Vboost is applied to the coil 13 is extended by a time interval (ta−t1). In the time interval (ta−t1), the peak current value Ipeak increases by the current correction quantity Iα, and the attractive force greater than or equal to the required valve-opening force Fopen is obtained.

As shown in FIG. 4, at S4 in the valve-opening control unit, the microcomputer 210 determines whether the coil current detection value I is greater than or equal to the peak current value (Ipeak+Iα) that is corrected. When the microcomputer 210 determines that the current value actually flowing through the coil 13 is greater than or equal to (Ipeak+Iα), the microcomputer 210 transmits an instruction to the integrated circuit 211 and terminates the application of the boost voltage Vboost.

Then, at S5, the pickup control is executed. At S5, the coil current is held at the pickup current value Ipick, the attractive force more gradually increases than the attractive force when the boost voltage Vboost is applied, and the static attractive force Fmax is greater than or equal to the required valve-opening force Fopen.

As shown in FIG. 4, S6 in the open valve maintenance control unit is executed. At S6, an instruction to flow a current having a current value greater than or equal to the holding current value Ihold is transmitted to the integrated circuit 211 to generate the attractive force greater than the open valve maintenance force Fhold that is necessary to hold the valve-opening state of the injector 10. The open valve maintenance force Fhold is less than the required valve-opening force Fopen.

As the above description, the microcomputer 210 of the electronic controller 21 according to the first embodiment terminates the control by executing S1 to S6. At S6, when the valve-opening state of the injector 10 is held, the injector 10 is fully opened, and the valve body 12 cannot move relative to the movable core 15. In other words, the valve-opening state of the injector 10 is a full lift state that the valve body 12 is fully lifted.

Next, effects of the first embodiment will be described.

According to the first embodiment, the current correction control unit corrects the peak current value Ipeak according to the decreasing quantity ΔV of the battery voltage Vbatt by increasing the peak current value Ipeak and sets the final peak current value (Ipeak+Iα). When the battery voltage Vbatt decreases, the attractive force greater than or equal to the required valve-opening force Fopen can be obtained.

Specifically, when the battery voltage Vbatt decreases, the attractive force greater than or equal to the required valve-opening force Fopen cannot be generated by the pickup control. The electronic controller 21 according to the first embodiment calculates the current correction quantity Iα according to the decreasing quantity ΔV of the battery voltage Vbatt to correct the peak current value Ipeak by increasing the peak current value Ipeak, at S20 in the current correction control unit. The final peak current value (Ipeak+Iα) is obtained by the correction. At S3 in the valve-opening control unit, the time interval where the boost voltage Vboost is applied to the coil 13 becomes longer. The attractive force greater than or equal to the required valve-opening force Fopen cannot be generated before the correction. Since the time interval where the boost voltage Vboost is applied to the coil 13 becomes longer, the attractive force greater than or equal to the required valve-opening force Fopen can be generated. Thus, when the battery voltage Vbatt decreases, the fuel injection quantity can be controlled by opening the injector 10.

According to the present embodiment, when the battery voltage decreases, the electronic controller energizes the coil by applying the boost voltage to the coil and executes the correction of the current value to increase a maximum value of the current flowing through the coil, thereby increasing the attractive force generated at the coil. In other words, the attractive force decreased due to a decrease of the battery voltage is corrected by the correction, and the attractive force can be increased to a force required to open the injector. Thus, when a power voltage of the battery decreases, the fuel injection can be controlled by opening the injector.

The control of the fuel injection control device according to the first embodiment is executed when a driving of a vehicle starts, the above effects of the first embodiment can be obtained.

Specifically, when the driving of the vehicle starts, it is necessary to execute an initial intake stroke and an initial compression stroke by transmitting a power to the internal combustion engine E from external. When the power is transmitted to the internal combustion engine E from external, a starter motor is attached to the internal combustion engine E. It is necessary that a power of the battery 23 is used to drive the starter motor. The battery 23 functions as a power source for components including the starter. When the driving of the vehicle starts, the power of the battery 23 is used most often. In a case where the driving of the vehicle starts, the decreasing of the battery voltage Vbatt remarkably decreases, it is possible that the fuel injection control using the battery voltage Vbatt is deteriorated. According to the first embodiment, the fuel injection control can be accurately executed when the battery voltage Vbatt decreases in a case where the driving of the vehicle starts.

Figure 5:
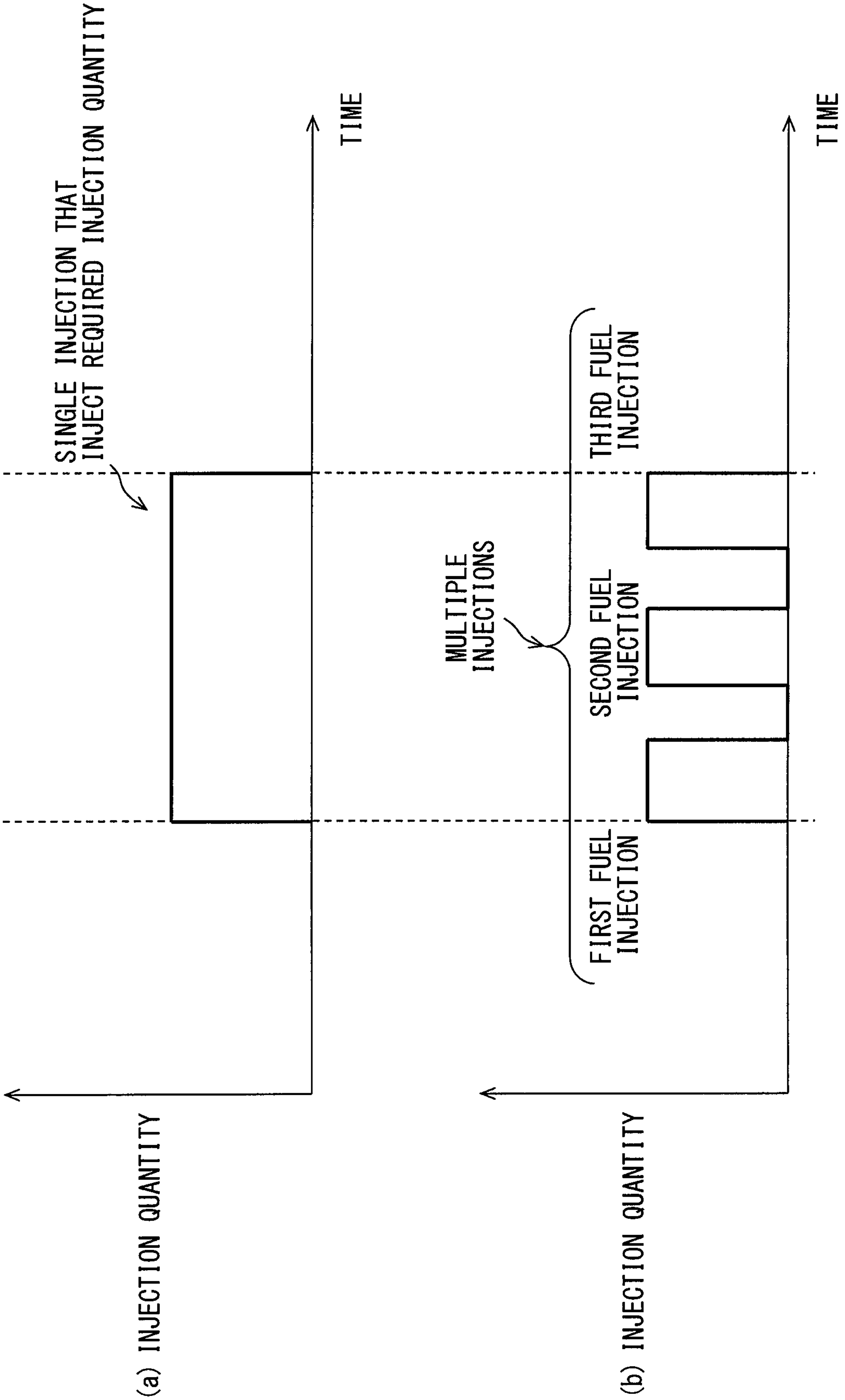
FIG. 5 includes (a) and (b), (a) is a graph showing a variation of an injection quantity over time, when a single injection is executed, (b) is a graph showing the variation of the injection quantity over time, when multiple injections are executed.

The control of the first embodiment can be applied to a configuration where multiple injections are executed to inject the injection quantity that is necessary in one combustion cycle, as shown in (b) of FIG. 5.

The multiple injections executed to inject the injection quantity that is necessary in one combustion cycle will be described. In the internal combustion engine E of a direct injection type, multiple injections may executed to inject the injection quantity that is necessary in one combustion cycle so as to improve a combustion efficiency. When a single injection is executed to inject the fuel for once as shown in (a) of FIG. 5, the fuel that is excessive adheres to a side surface of each cylinder of the internal combustion engine E, the fuel is left after the combustion, and the fuel may not be properly combusted. When the multiple injections are executed to inject the fuel with a specified quantity by dividing into multiple times, the fuel that is left after the combustion can be reduced, and the combustion efficiency can be improved.

When the fuel injection control according to the first embodiment is executed by the multiple injections in a case where the battery voltage Vbatt decreases in the driving of the internal combustion engine E by the multiple injections, the attractive force can be increased to the force that is required to open the injector, and the multiple injections with accuracy can be executed.

The fuel injection control according to the first embodiment is executed by selecting one of the multiple injections that inject the injection quantity that is necessary in one combustion cycle. A control that corrects the peak current value Ipeak may be executed by using the current correction quantity Iα set in the above case for other injections. Since the fuel injection control according to the first embodiment is executed for once and other fuel injection controls use a result of the fuel injection control according to the first embodiment, a processing load of the electronic controller 21 can be reduced.

When the result of the fuel injection control according to the first embodiment is used, fuel injections that are next to each other may use the result. For example, as shown in (b) of FIG. 5, when the multiple injections are executed, the fuel injections that are next to each other are a first fuel injection and a second fuel injection, or the fuel injections are the second fuel injection and a third fuel injection. In other words, the fuel injection control according to the first embodiment is executed in the first fuel injection, and then the current correction quantity Iα calculated in the first fuel injection is used to execute the second fuel injection. Then, the fuel injection control according to the first embodiment is executed again in the third fuel injection. Alternatively, the fuel injection control according to the first embodiment is executed in the first fuel injection, the fuel injection control according to the first embodiment is executed again in the second fuel injection, and the current correction quantity Iα calculated in the second fuel injection is used to execute the third fuel injection.

In other words, the fuel injection control according to the first embodiment is executed by selecting one of the multiple injections, and the result of the one of the multiple injections is used in other multiple injections.

When the result of the fuel injection control according to the first embodiment is used in the multiple injections, it is preferable that the fuel injection control according to the first embodiment is executed before the multiple injections. In other words, the multiple injections are executed after the fuel injection control according to the first embodiment is executed.

Second Embodiment

Hereafter, the fuel injection control device according to a second embodiment of the present disclosure will be described. The substantially same configurations as the first embodiment and the same description will be omitted.

Figure 6:
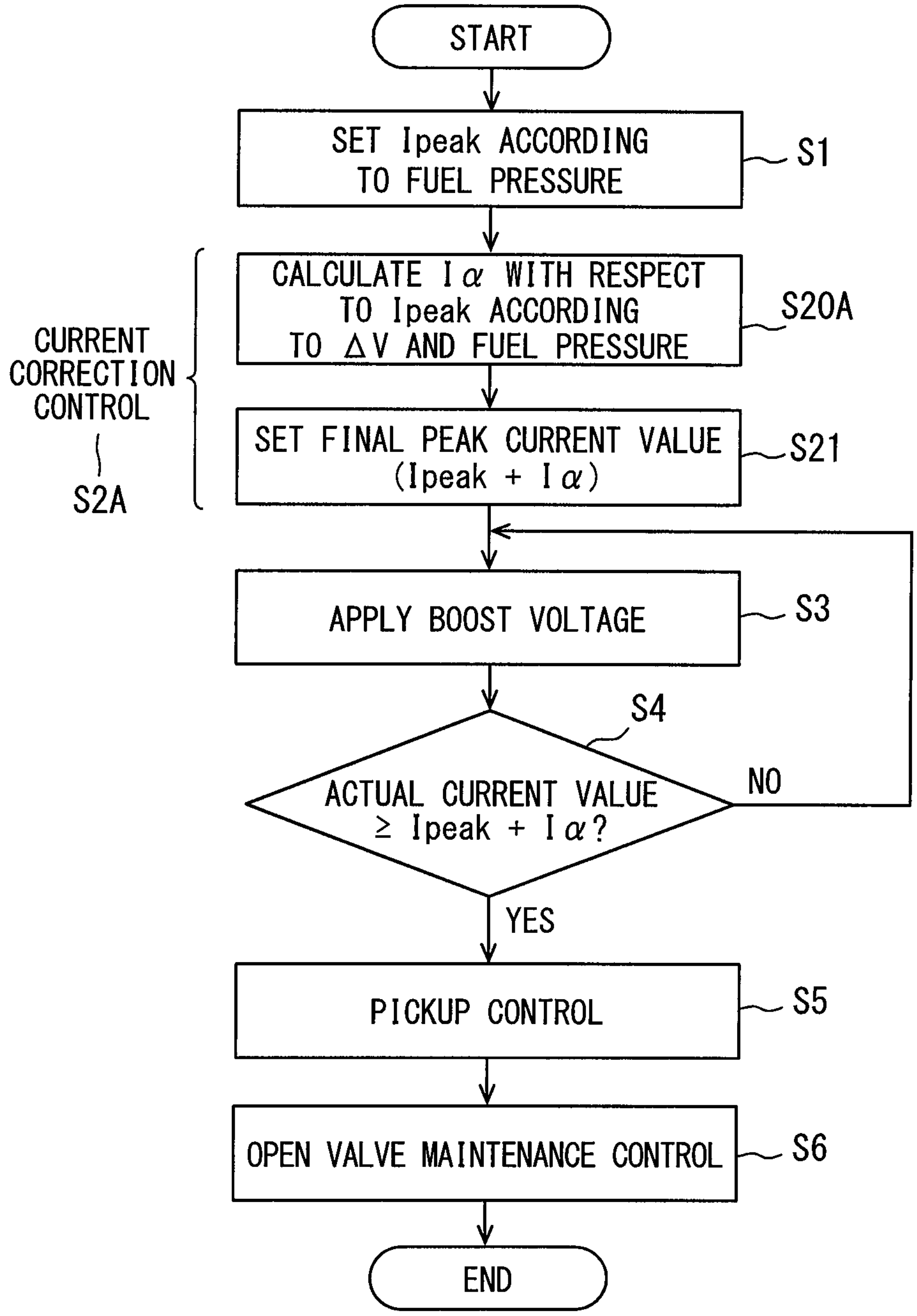
FIG. 6 is flowchart showing the control executed by the electronic controller according to at least one embodiment of the present disclosure.

FIG. 6 is a flowchart showing the fuel injection control according to the second embodiment. The microcomputer 210 of the electronic controller 21 according to the second embodiment functions as the valve-opening control unit, the open valve maintenance control unit and the current correction control unit.

The second embodiment differs from the first embodiment that the current correction quantity Iα with respect to the peak current value Ipeak is calculated according to the decreasing quantity ΔV of the battery voltage Vbatt and the fuel pressure of the fuel supplied into the injector 10 at S20A in the current correction control unit.

The electronic controller 21 according to the second embodiment previously establishes a map indicating a correlation between the current correction quantity Iα of the peak current, the decreasing quantity ΔV of the battery voltage Vbatt and the fuel pressure supplied to the injector 10 at S20A shown in FIG. 6. The electronic controller 21 stores the map in a memory of the electronic controller 21. The electronic controller 21 sets the current correction quantity Iα by the map. Then, the flows same as those in the first embodiment are executed.

Hereafter, effects of the second embodiment will be described.

According to the second embodiment different from the first embodiment, the current correction quantity Iα with respect to the peak current value Ipeak is calculated according to the decreasing quantity ΔV of the battery voltage Vbatt and a value of the fuel pressure of the fuel supplied into the injector 10. Thus, the correction can be executed more accurately than that according to the first embodiment.

Specifically, at S20A in the current correction control unit according to the first embodiment, the current correction quantity Iα of the peak current value is calculated according to the decreasing quantity ΔV of the battery voltage Vbatt. When the fuel pressure of the fuel supplied into the injector 10 is low while the battery voltage Vbatt decreases, the required valve-opening force Fopen becomes lower. In this case, the required valve-opening force Fopen is a sum of the elastic force of the elastic component and the fuel pressure. When the peak current is corrected to increase the attractive force in a case where the battery voltage Vbatt decreases, an unnecessary force is generated. Then, the movable core and the valve body rapidly move according to the attractive force that is excessive, and a noise is generated in the internal combustion engine E according to movements of the movable core and the valve body. In this case, the movements include a sliding movement. When the movable core vigorously collides with the stator core, an abrasion is generated at a collision surface, and thereby leading to a malfunction of the injector 10. Since the peak current value is excessively corrected by being increased, a power that the coil 13 consumes increases. In this case, a heat dissipation quantity of the coil 13 increases, an electric resistance of the coil 13 increases, and a valve-opening ability is deteriorated.

At S20A in the current correction control unit according to the second embodiment, the current correction quantity Iα of the peak current value is calculated according to the decreasing quantity ΔV of the battery voltage Vbatt and the pressure of the fuel supplied into the injector 10. As the above description, when the fuel pressure is low and the required valve-opening force Fopen is low while the battery voltage Vbatt decreases, the current correction quantity Iα of the peak current value which is necessary to generate the attractive force greater than or equal to the required valve-opening force can be accurately calculated. Thus, it can be suppressed that the coil 13 dissipates heat due to a generation of the noise, the abrasion generated at the collision surface or an increasing of a consumption power, according to S20A in the current correction control unit according to the second embodiment.

Similar to the first embodiment, the second embodiment can be also applied to a configuration where the multiple injections are executed in the internal combustion engine E. In this case, effects of the first and second embodiment can be obtained.

Third Embodiment

Hereafter, the fuel injection control device according to a third embodiment of the present disclosure will be described. The substantially same configurations as the first embodiment and the second embodiment and the same description will be omitted.

According to the third embodiment that is different from the first and second embodiments, the microcomputer 210 of the electronic controller 21 functions as the valve-opening control unit, the open valve maintenance control unit and a current continuation control unit. In operations from S70 to S74 in S7 in the current continuation control unit, the boost voltage Vboost is controlled by a duty control in a predetermined time interval without executing the correction of the peak current value Ipeak. A control that continuously controls an average value of the current flowing through the coil 13 at the peak current value Ipeak is executed. In this case, the current is continued to be in a state that the average value of the current is the peak current value Ipeak.

Figure 7:
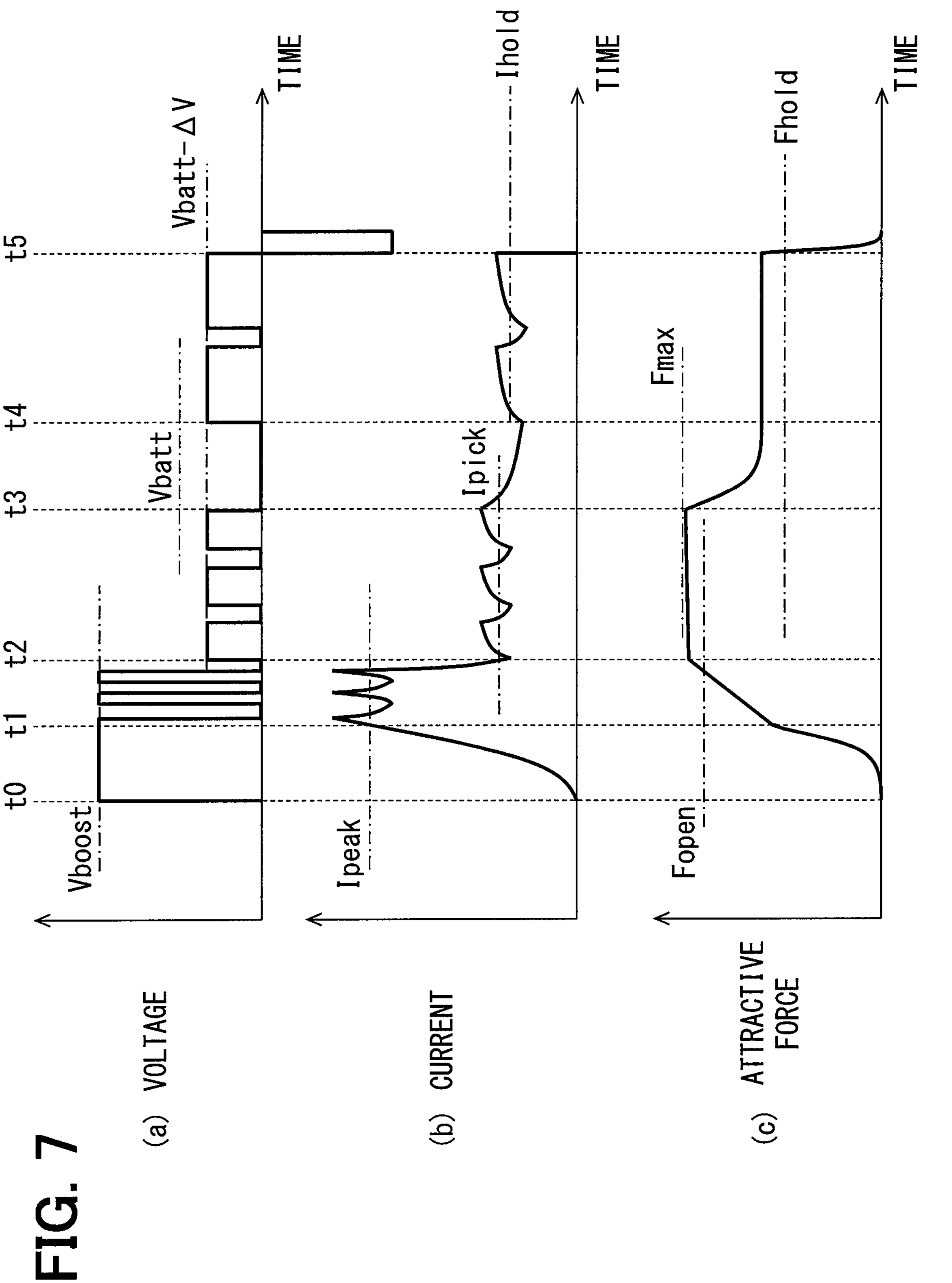
FIG. 7 includes (a), (b) and (c), (a) is a graph showing the variation of the applied voltage of the coil over time, (b) is a graph showing the variation of the current flowing through the coil over time, (c) is a graph showing the variation of the attractive force over time, when the electronic controller executes the injection control according to a third embodiment of the present disclosure.
Figure 8:
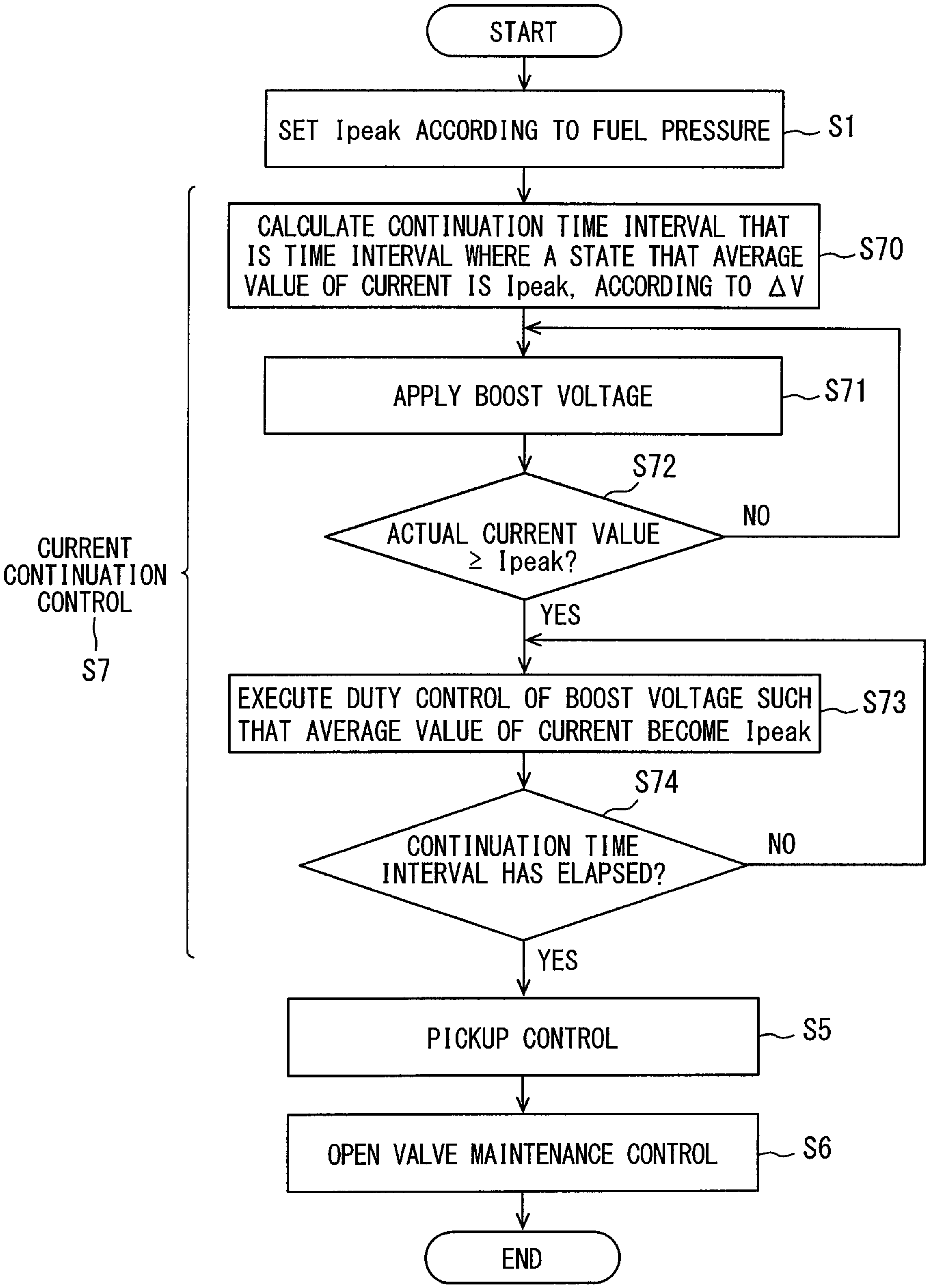
FIG. 8 is a flowchart showing the control executed by the electronic controller according to at least one embodiment of the present disclosure.

Specifically, referring to FIG. 7, at S1 in the valve-opening control unit shown in FIG. 8 according to the third embodiment, similar to the first and second embodiments, the peak current value Ipeak shown in FIG. 7 is set according to the fuel pressure of the fuel supplied into the injector 10.

Next, S70 of the current continuation control unit is executed as shown in FIG. 8. At S70, a continuation time interval where the average value of the current flowing through the coil 13 is continued in the state that the average value of the current is the peak current value Ipeak for the predetermined time interval by the duty control of the boost voltage Vboost is calculated according to the decreasing quantity ΔV of the battery voltage Vbatt. The continuation time interval is a time interval from a time point t1 to a time point tb shown in FIG. 7. The continuation time interval is set to correct the attractive force that is insufficient to be greater than or equal to the required valve-opening force Fopen due to the decreasing of the battery voltage Vbatt, by continuing the state that the average value of the current is the peak current value Ipeak. In other words, when the battery voltage (Vbatt−ΔV) that is obtained from the battery voltage Vbatt decreased by the decreasing quantity ΔV becomes lower than a predetermined voltage value that the attractive force greater than or equal to the required valve-opening force Fopen cannot be generated, the electronic controller 21 calculates the continuation time interval. Then, the electronic controller 21 executes a control to extend the state that the average value of the current is the peak current value Ipeak for the continuation time interval. In this case, an extending time interval is set according to the decreasing quantity ΔV of the battery voltage Vbatt. When the battery voltage (Vbatt−ΔV) is lower than the predetermined voltage value, the control in S70 may be executed. Alternatively, the control in S70 may be executed every time that the continuation time interval is calculated according to the decreasing quantity ΔV of the battery voltage Vbatt.

At S71 in the current continuation control unit shown in FIG. 8, an instruction to apply the boost voltage Vboost to the coil 13 until the coil current detection valve I becomes the peak current value Ipeak is transmitted to the integrated circuit 211. In this case, the coil current detection value I becomes the peak current value Ipeak, but the attractive force generated at the coil 13 is not a value greater than or equal to the required valve-opening force Fopen.

At S72 in the current continuation control unit shown in FIG. 8, it is determined whether the coil current detection value I is greater than or equal to the peak current value (Ipeak+Iα) that is corrected.

Next, when it is determined that the coil current detection value I is greater than or equal to the peak current value Ipeak at S72 shown in FIG. 8, the boost voltage Vboost is controlled by the duty control at S73 in the current continuation control unit shown in FIG. 8. The continuation time interval is controlled such that the average value of the coil current detection value I becomes the peak current value Ipeak. Since the continuation time interval is set to correct the attractive force that is insufficient due to the decreasing of the battery voltage Vbatt, the attractive force becomes greater than or equal to the required valve-opening force Fopen when the state that the average value of the current is the peak current value Ipeak is continued for the continuation time interval. In other words, at S74 shown in FIG. 8, when it is determined that the state that the average value of the current is the peak current value Ipeak is continued for a time interval longer than or equal to the continuation time interval, S74 is terminated.

Then, similar to the first and second embodiments, the microcomputer 210 of the electronic controller 21 according to the third embodiment executes S5 in the valve-opening control unit, executes S6 in the open valve maintenance control unit, and then terminates the control.

Hereafter, effects of the third embodiment will be described.

According to the third embodiment, the electronic controller 21 controls the boost voltage Vboost by the duty control during the continuation time interval that is calculated according to the decreasing quantity ΔV of the battery voltage Vbatt, and executes a current continuation control to control the average value of the coil current detection value I at the peak current value Ipeak. According to the embodiments described as above, a time interval that the boost voltage Vboost is applied to the coil is a time interval from the time point t0 to the time point t1. According to the third embodiment, the time interval is extended to a time interval from the time point t0 to the time point tb. Thus, the coil current sharply increases according to the boost voltage Vboost, and the attractive force sharply increases. The attractive force greater than or equal to the required valve-opening force Fopen can be generated when the battery voltage Vbatt decreases. Similar to the first embodiment, when the battery voltage Vbatt decreases, the fuel injection quantity can be controlled by opening the injector 10.

According to the present embodiment, a state that the attractive force sharply increases can be continued by continuing a state that the average value of the current flowing through the coil is maximum for the continuation time interval calculated according to the decreasing quantity of the battery voltage. Thus, the attractive force required to open the injector can be generated when the battery voltage decreases, and the fuel injection quantity can be controlled by opening the injector when the battery voltage decreases.

Fourth Embodiment

Hereafter, the fuel injection control device according to a fourth embodiment of the present disclosure will be described. The substantially same configurations as the first embodiment and the third embodiment and the same description will be omitted.

According to the fourth embodiment that is different from the first, second and third embodiments, the microcomputer 210 of the electronic controller 21 functions as a valve-opening assist control unit that executes a valve-opening assist control to control a current having a magnitude of a pre current value Ipre to flow through the coil 13 before executing the correction of the peak current value Ipeak.

Figure 9:
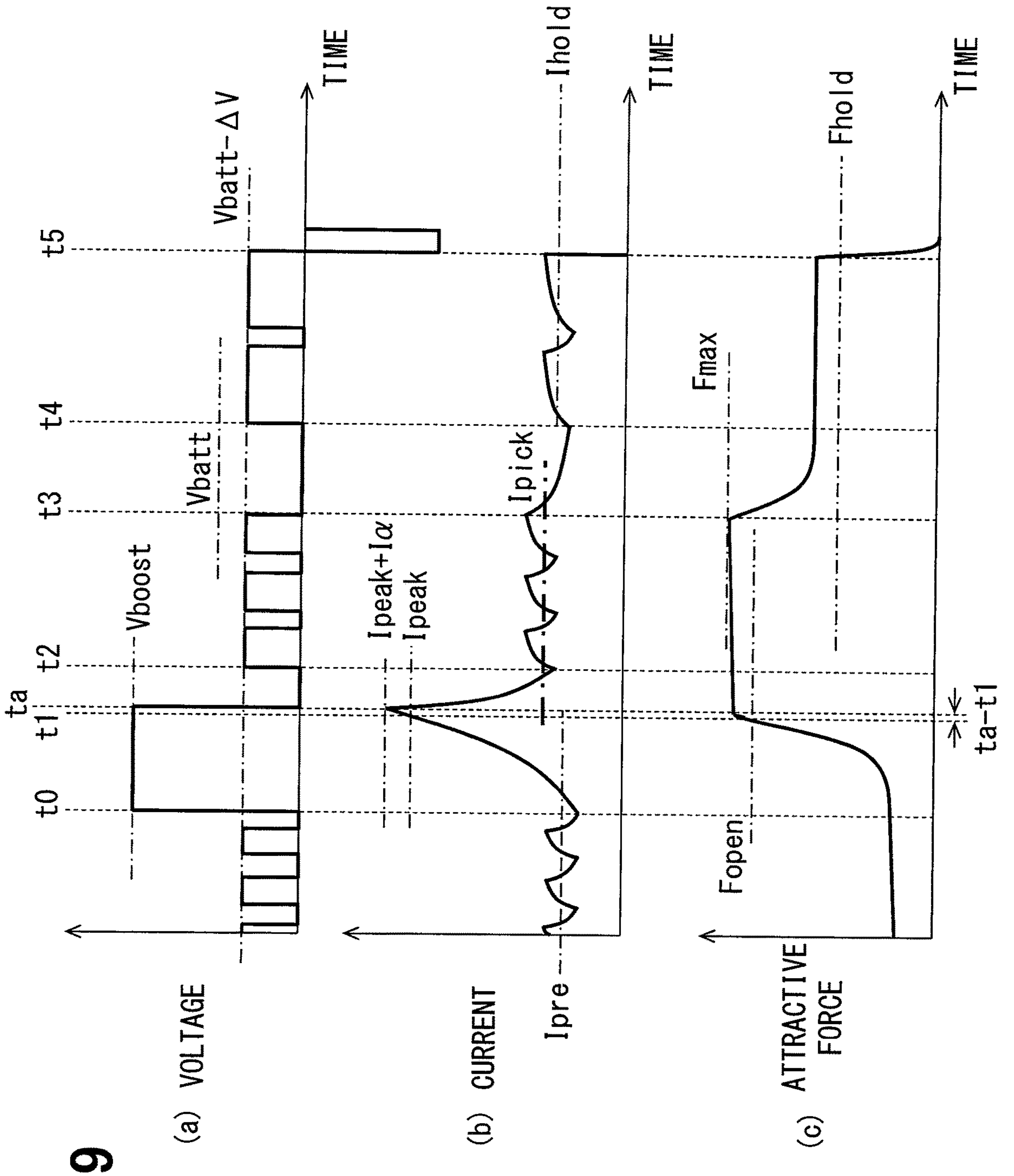
FIG. 9 includes (a), (b) and (c), (a) is a graph showing the variation of the applied voltage of the coil over time, (b) is a graph showing the variation of the current flowing through the coil over time, (c) is a graph showing the variation of the attractive force over time, when the electronic controller executes the injection control according to at least one embodiment of the present disclosure.

Referring to FIG. 9, at S8 in the valve-opening assist control unit, the battery voltage Vbatt is controlled by the duty control before a valve-opening control, and the average value of the coil current is set to the pre current value Ipre. In other words, the battery voltage Vbatt is controlled by the duty control such that the average value of the coil current becomes the pre current value Ipre, before the time point to that the boost voltage Vboost starts to be applied to the coil. Since the coil current occurs according to the pre current value Ipre before the time point t0 shown in FIG. 9, the attractive force generated at the coil 13 gradually increases. When the current of the pre current value Ipre flows through the coil, the attractive force is previously generated at the coil 13. A magnitude of the pre current value Ipre is set to a value less than that of the pickup current value Ipick and that of the holding current value Ihold.

Similar to the first, second and third embodiments, the attractive force sharply increases according to the application of the boost voltage Vboost, and the attractive force greater than or equal to the required valve-opening force Fopen is generated.

In other words, at S8 in the valve-opening assist control, an assist of the generation of the attractive force that is required to open the injector 10 is executed.

Hereafter, effects of the fourth embodiment will be described.

According to the first embodiment and the second embodiment, the control that sharply increases the coil current to the final peak current value (Ipeak+Iα) set by the current correction control unit as a target. The attractive force generated at the coil 13 sharply increases while the coil current sharply increases. Then, the movable core is suddenly attracted and vigorously collides with the stator core. It is possible that the injector 10 malfunctions due to the noise generated by the collision between the movable core and the stator core or the abrasion between the movable core and the stator core.

According to the fourth embodiment, the battery voltage Vbatt is controlled by the duty control before a valve-opening control, the coil current having a current value equal to the pre current value Ipre is generated, and the attractive force having a predetermined magnitude is generated, before the valve-opening control. Thus, the attractive force greater than or equal to the required valve-opening force Fopen can be surely generated in a case where the attractive force is previously generated and the attractive force of the coil 13 is unnecessary to sharply increase at S3 and S4 in the valve-opening control unit. Since the movable core does not move suddenly, the generation of the noise or a generation of the abrasion between the movable core and the stator core can be suppressed.

Figure 10:
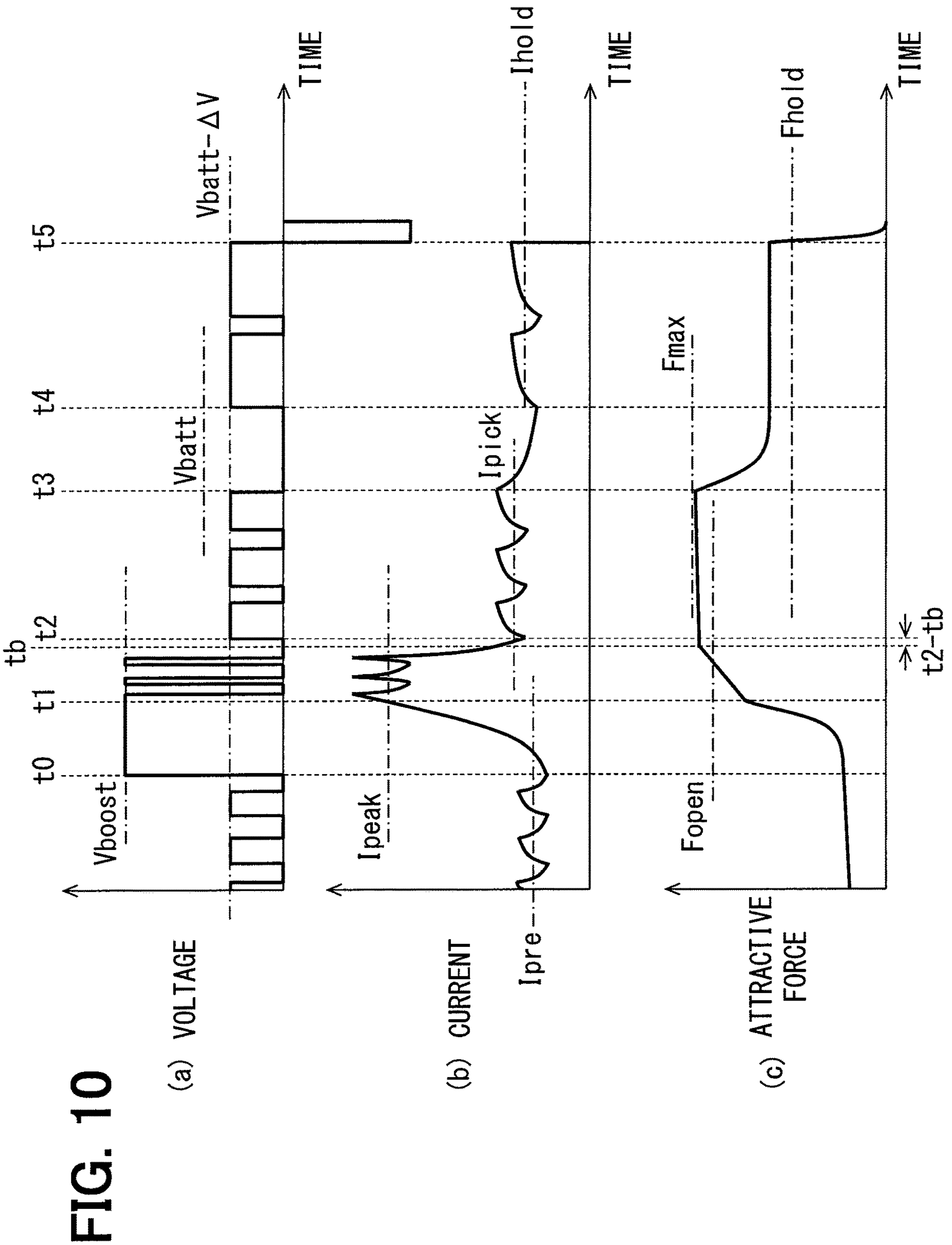
FIG. 10 includes (a), (b) and (c), (a) is a graph showing the variation of the applied voltage of the coil over time, (b) is a graph showing the variation of the current flowing through the coil over time, (c) is a graph showing the variation of the attractive force over time, when the electronic controller executes the injection control according to a modification example of at least one embodiment of the present disclosure.

As shown in FIG. 10, similar to the third embodiment, effects of the modification example of the fourth embodiment where the attractive force greater than or equal to the required valve-opening force Fopen is generated when the state that the coil current is the peak current value Ipeak is continued for the continuation time interval will be described.

Similar to the fourth embodiment, the battery voltage Vbatt is controlled by the duty control before the valve-opening control, the coil current having a current value equal to the pre current value Ipre is generated, and the attractive force having a predetermined magnitude is generated, before the valve-opening control unit executes the control. Since the attractive force generated by the pre current value Ipre, the attractive force greater than or equal to the required valve-opening force Fopen can be generated earlier than other embodiments. In other words, the continuation time interval is a time interval from the time point t1 to the time point t2 in the third embodiment as shown in FIG. 7, the continuation time interval is a time interval from the time point t1 to the time point tb in the modification example of the fourth embodiment as shown in Fi0, and the continuation time interval is shortened by t2–tb. Thus, since the time interval where the coil current having a value equal to the peak current value Ipeak continuously flows is shorter, a power consumed at the coil 13 can be reduced.

Other Embodiment

The present disclosure is not limited to the embodiments mentioned above, and can be applied to various embodiments as followings. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

According to the second embodiment, the current correction quantity Iα with respect to the peak current value Ipeak is calculated according to the decreasing quantity ΔV of the battery voltage Vbatt and the value of the fuel pressure of the fuel supplied into the injector 10. Alternatively, the current correction quantity Iα may be calculated based on a combination of fuel characteristics other than the fuel pressure. In this case, the fuel characteristics include a temperature of the fuel or the viscosity of the fuel.

Alternatively, the current correction quantity Iα may be calculated by using a slidable number that is an operation number of the elastic component in the injector 10 and is previously stored. When the valve-opening operation and the valve-closing operation of the injector 10 are repeatedly executed, the elastic component becomes fatigue, and the elastic force of the elastic component decreases. Thus, the required valve-opening force Fopen of the injector 10 varies according to the operation number of the elastic component. The correction can be executed with a high accuracy by using the operation number of the elastic component while calculating the current correction quantity Iα.

Alternatively, the correction can be executed with a high accuracy by using the temperature of the coil 13 while calculating the current correction quantity Iα.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A fuel injection control device that controls an operation of an injector that injects a fuel into an internal combustion engine, the fuel injection control device comprising:

an electric controller to control an opening and closing of the injector by energizing a coil in the injector; and a booster circuit to boost a battery voltage that is a voltage supplied from a battery to generate a boost voltage, wherein the electric controller includes a computer programmed to at least perform:

a valve-opening control to apply the boost voltage to the coil and then to apply the battery voltage to the coil to generate a required valve-opening force that is an attractive force required to start to open the injector, an open valve maintenance control to apply the battery voltage to the coil to generate an open valve maintenance force that is an attractive force holding the opening of the injector and is smaller than the required valve-opening force, after the valve-opening control, and a current correction control to correct a maximum value of a current flowing through the coil when the boost voltage is applied to the coil to increase the maximum value of the current flowing through the coil in the valve-opening control, according to a decreasing quantity of the battery voltage, the current correction control sets a correction quantity according to the decreasing quantity of the battery voltage and a pressure of the fuel supplied to the injector, and the current correction control suppresses a correction when the required valve-opening force becomes lower while a fuel pressure that is a pressure of the fuel becomes lower in a case where the battery voltage decreases.

2. The fuel injection control device according to claim 1, wherein the valve-opening control applies the boost voltage to the coil to generate the attractive force that is the required valve-opening force in a case where the current correction control is executed.

3. The fuel injection control device according to claim 1, wherein the current correction control is executed when a driving of the internal combustion engine starts.

4. The fuel injection control device according to claim 1, wherein the current correction control is executed for all of multiple injections executed in the driving of the internal combustion engine that executes the multiple injections to divide an injection quantity required in one combustion cycle.

5. The fuel injection control device according to claim 1, wherein the electric controller is further programmed to select a single injection among multiple injections and execute the current correction control for the single injection, and then use the correction quantity calculated in the current correction control for other injections that are not selected, in the driving of the internal combustion engine that executes the multiple injections to divide an injection quantity required in one combustion cycle.

6. The fuel injection control device according to claim 1, further comprising:

the electric controller includes a valve-opening assist control to assist the opening of the injector by an attractive force generated by applying the battery voltage to the coil, before the valve-opening control is executed.

7. A fuel injection system comprising:

at least one injector to inject a fuel into at least one corresponding cylinder of an internal combustion engine;

a delivery pipe to distribute and supply the fuel to the injector of each corresponding cylinder of the internal combustion engine;

a high-pressure pump to pump a high-pressure fuel that is the fuel a pressure of which is increased into the delivery pipe;

a fuel pressure sensor attached to the delivery pipe and to sense a fuel pressure of the fuel in the delivery pipe; and a fuel injection control device to include an electric controller to control an opening and closing of the injector by energizing a coil in the injector, and a booster circuit to boost a battery voltage that is a voltage supplied from a battery to generate a boost voltage, wherein the electric controller includes a computer programmed to at least perform:

a valve-opening control to apply the boost voltage to the coil and then to apply the battery voltage to the coil to generate a required valve-opening force that is an attractive force required to start to open the injector, an open valve maintenance control to apply the battery voltage to the coil to generate an open valve maintenance force that is an attractive force holding the opening of the injector and is smaller than the required valve-opening force, after the valve-opening control, and a current correction control to correct a maximum value of a current flowing through the coil when the boost voltage is applied to the coil to increase the maximum value of the current flowing through the coil in the valve-opening control, according to a decreasing quantity of the battery voltage, the current correction control sets a correction quantity according to the decreasing quantity of the battery voltage and a pressure of the fuel supplied to the injector, and the current correction control suppresses a correction when the required valve-opening force becomes lower while a fuel pressure that is a pressure of the fuel becomes lower in a case where the battery voltage decreases.

8. The fuel injection system according to claim 7, wherein the valve-opening control applies the boost voltage to the coil to generate the attractive force that is the required valve-opening force in a case where the current correction control is executed.

9. The fuel injection system according to claim 7, wherein the current correction control is executed when a driving of the internal combustion engine starts.

10. The fuel injection system according to claim 7, wherein the current correction control is executed for all of multiple injections executed in the driving of the internal combustion engine that executes the multiple injections to divide an injection quantity required in one combustion cycle.

11. The fuel injection system according to claim 7, wherein the electric controller selects a single injection among multiple injections and executes the current correction control for the single injection, and then uses the correction quantity calculated in the current correction control for other injections that are not selected, in the driving of the internal combustion engine that executes the multiple injections to divide an injection quantity required in one combustion cycle.

12. The fuel injection system according to claim 7, further comprising:

the electric controller includes a valve-opening assist control to assist the opening of the injector by an attractive force generated by applying the battery voltage to the coil, before the valve-opening control is executed.

13. A fuel injection control device that controls an operation of an injector that injects a fuel into an internal combustion engine, the fuel injection control device comprising:

an electric controller to control an opening and closing of the injector by energizing a coil in the injector; and a booster circuit to boost a battery voltage that is a voltage supplied from a battery to generate a boost voltage, wherein the electric controller includes a computer programmed to at least perform:

a valve-opening control to apply the boost voltage to the coil and then to apply the battery voltage to the coil to generate a required valve-opening force that is an attractive force required to start to open the injector, an open valve maintenance control to apply the battery voltage to the coil to generate an open valve maintenance force that is an attractive force holding the opening of the injector and is smaller than the required valve-opening force, after the valve-opening control, and a current correction control to correct a maximum value of a current flowing through the coil when the boost voltage is applied to the coil in the valve-opening control, according to a decreasing quantity of the battery voltage, the current correction control sets a correction quantity according to the decreasing quantity of the battery voltage and a pressure of the fuel supplied to the injector, the current correction control suppresses a correction when the required valve-opening force becomes lower while a fuel pressure that is a pressure of the fuel becomes lower in a case where the battery voltage decreases; and the electric controller is further programmed to a single injection among multiple injections and execute the current correction control for the single injection, and then use the correction quantity calculated in the current correction control for other injections that are not selected, in the driving of the internal combustion engine that executes the multiple injections to divide an injection quantity required in one combustion cycle.

* * * * *